TRANSISTOR AMPLIFIER CIRCUIT
Filed Sept. 30, 1954
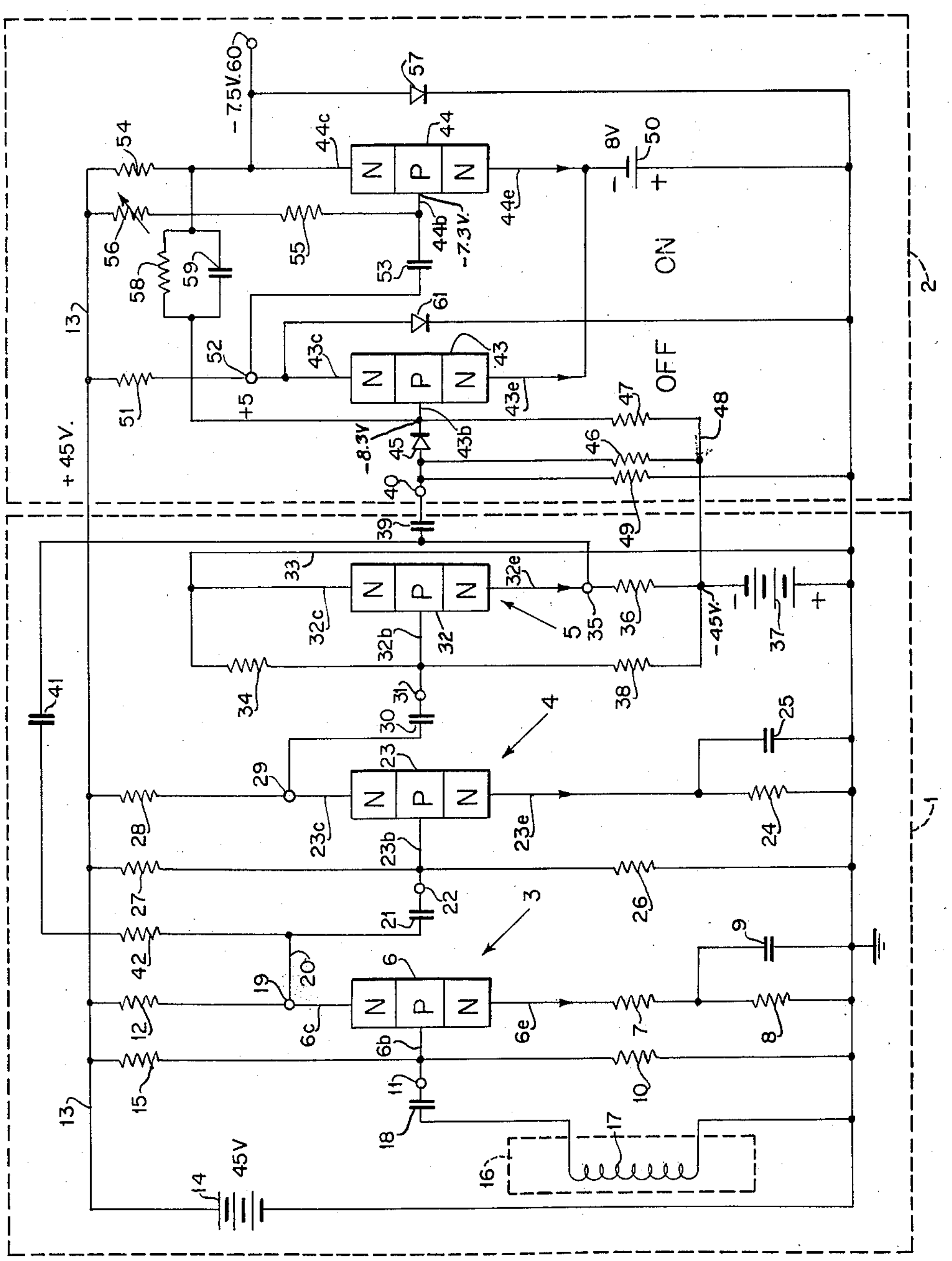
INVENTOR.
JAMES L. WALSH
JOSEPH C. LOGUE
BY ROBERT L. MARTIN
P. E. Henninger
ATTORNEY United States Patent Office 2,861,258

Patented Nov. 18, 1958

2,861,258

TRANSISTOR AMPLIFIER CIRCUIT

James L. Walsh, Hyde Park, Joseph C. Logue, Kingston, and Robert L. Martin, Pleasant Valley, N. Y., assignors to International Business Machines Corporation, New York, N. Y., a corporation of New York Application September 30, 1954, Serial No. 459,282

2 Claims. (Cl. 340—174)

This invention relates to transistor amplifier circuits, and especially to circuits for amplifying signal pulses from a magnetic read head and for producing square output waves in response to those signal pulses.

In high speed computers, it is common to store information by utilizing magnetized areas on the surface of a magnetic tape or drum. When it is desired to read the information thus stored, the tape or drum is run past a pickup head, commonly termed a read head, having a magnetic coil in which electromotive forces are induced, varying in accordance with the magnetic condition of the drum or tape. It is customary to run the read head and the tape so that the stored information is scanned rapidly. For example, in one particular machine, the magnetic storage drum is run past the read head at a speed such that the magnetic bits stored on the drum appear in the read head coil as signals having a frequency of 68 kilocycles per second.

In digital computers of the type described, it has become convention to handle the digits in the form of square wave electrical signals. Square waves are preferred to other wave forms, because they are more readily distinguished from waves due to stray magnetic fields, and because they may be handled with greater accuracy.

The signals produced in a read head coil by running a tape or drum past it at high speed are not square, but tend to be sinusoidal, even when the magnetized areas on the tape or drum are sharply defined. Furthermore, the signals are too weak to be used directly by the computer circuits.

It has been customary to amplify the signals produced in the coil of a read head by means of a vacuum tube amplifier, and to produce square wave output pulses corresponding to the more nearly sinusoidal waves in the read head coil, by means of other vacuum tube circuits.

The use of transistors for such amplifier and wave shaping circuits presents difficulties because of the frequency limitations of transistors. Difficulty has been encountered with transistor circuits for this purpose because of the necessity of having a fairly wide frequency band over which the circuits will operate. For example, in the machine mentioned above where a normal reading speed of 68 kilocycles was provided, it was found that the amplifier circuit must be effective up to at least 120 kilocycles, in order to avoid serious distortion of the input signal.

An object of the present invention is to provide an improved transistor amplifier circuit for the purpose described.

Another object is to provide a transistor amplifier circuit having improved impedance matching characteristics and improved band width characteristics.

Another object is to provide an improved stage for a transistor amplifier which is adapted to have a high input impedance and to operate over a wide frequency band.

Another object is to provide a multi-stage transistor amplifier with a feedback to improve the band width characteristics.

Another object is to provide a combined amplifier and single-shot trigger circuit employing transistors, to perform amplifying and wave shaping functions.

Another object is to provide an improved single-shot trigger circuit.

The foregoing objects of the invention are attained by providing an amplifier circuit including three transistor stages coupled together and driving a two transistor single-shot trigger circuit.

The first stage of the amplifier is provided with a high input resistance which adapts that stage to match the impedance of a magnetic pickup coil, and which also provides a series feedback in that stage, to widen the band of operating frequencies. The first stage and the second stage are grounded emitter stages, and the third is a grounded collector stage to provide a low output impedance. A parallel feedback is provided between the output of the third stage and the input of the second stage to improve the width of the frequency band.

The third stage drives a single-shot trigger circuit including two transistors, one of which is normally "on" and the other normally "off." When a signal is received from the amplifier, the conditions of the two transistors in the trigger are reversed. They will remain in their reversed condition for a time determined by a resistance-capacitance circuit, so that the single shot produces a square wave output signal of fixed duration in response to a sine wave or other shaped input signal.

Other objects and advantages of the invention will become apparent from a consideration of the following specification and claims, taken together with the accompanying drawing.

In the drawing, the single figure is a wiring diagram of a preferred form of transistor amplifier circuit embodying the invention.

Referring to the drawing, the circuit there shown includes a three stage transistor amplifier generally indicated by the reference numeral 1, and supplying signal pulses to a single-shot trigger circuit generally indicated by the reference numeral 2. The amplifier 1 comprises three stages, respectively, generally indicated by the reference numerals 3, 4 and 5.

Stage 3 comprises an NPN junction transistor 6, having an emitter electrode **6*e*, a base electrode 6*b* and a collector electrode 6*c*. Emitter electrode 6*e* is connected to ground through two resistors 7 and 8 in series. A capacitor 9 is provided in parallel with resistor 8, but resistor 7** is not by-passed by a capacitor.

Base electrode **6*b* is connected to ground through a resistor 10 and is also connected to an input terminal 11. Collector electrode 6*c* is connected through a load resistor 12 and a wire 13 to the positive terminal of a battery 14, whose negative terminal is grounded. A resistor 15 is connected between base 6*b* and wire 13**.

The magnetic read-head is schematically indicated at 16, and includes a coil 17 having one terminal connected to ground and the other connected through a coupling condenser 18 to the input terminal 11 of stage 3.

Collector **6*c* is connected to an output terminal 19 which is in turn connected through a wire 20 and a capacitor 21 to an input terminal 22 of stage 4. Stage 4 includes an NPN junction transistor 23 having an emitter electrode 23*e*, a base electrode 23*b*, and a collecter electrode 23*c*. Emitter 23*e* is connected to ground through a resistor 24 and a parallel capacitor 25. Base 23*b* is connected to ground through a resistor 26, and to wire 13 through a resistor 27. Collector 23*c* is connected to wire 13 through a resistor 28. Input terminal 22 is connected to base 23***b*, and an output terminal 29 is connected to collector 23*c*. Output terminal 29 is connected through a coupling capacitor 30 to an input terminal 31 of stage 5.

Stage 5 includes an NPN junction transistor 32 having an emitter electrode 32*e*, a base electrode 32*b*, and a collector electrode 32*c*. Collector electrode 32*c* is connected through a wire 33 to ground. A resistor 34 is connected between collector 32*c* and base 32*b*. Emitter 32*e* is connected to an output terminal 35 and is thence connected through a load resistor 36 and a battery 37 to ground. A resistor 38 connects base 32*b* to the common junction of resistor 36 and battery 37. Output terminal 35 is connected through a coupling capacitor 39 to an input terminal 40 of the single shot trigger circuit 2. Output terminal 35 is also connected through a feedback coupling capacitor 41 and a resistor 42 to the output terminal 19 of stage 3.

The single shot trigger circuit 2 comprises two NPN junction transistors 43 and 44 having emitter electrodes 43*e* and 44*e*, base electrodes 43*b* and 44*b*, and collector electrodes 43*c* and 44*c*.

Input terminal 40 is connected to base 43*b* through a diode 45. Resistors 46 and 47 respectively connect the opposite sides of diode 45 to a wire 48 which is maintained at —45 volts by being connected to the negative terminal of battery 37. Another resistor 49 is connected between the left hand terminal of diode 45 and ground.

Emitter 43*e* is connected through a biasing battery 50 to ground. Collector 43*c* is connected through a resistor 51 to the positive supply line 13. An output terminal 52 is connected to collector 43*c* and is also connected through a coupling capacitor 53 to the base 44*b* of transistor 44. A clamping diode 61 is connected between collector 43*c* and ground.

Emitter 44*e* is connected through battery 50 to ground. Collector 44*c* is connected through a resistor 54 to wire 13. Base 44*b* is connected to a fixed resistor 55 and a variable resistor 56 to wire 13.

A clamping diode 57 is connected between collector 44*c* and ground.

A cross-coupling connection is provided between collector 44*c* and base 43*b*, said connection including a resistor 58 and a parallel capacitor 59.

Collector 44*c* is connected to an output terminal 60, which serves as the main output terminal for the combined amplifier and single shot unit.

While NPN junction transistors are employed in the foregoing circuits, it will be readily understood that PNP junction transistors could be employed with equal facility by reversing the polarities of all batteries.

The following table presents, by way of example, particular values for the potentials of the various batteries and for the impedances of the various resistors and capacitors, in a circuit which has been operated successfully. In some cases, the values are also shown on the drawing. These values are set forth by way of example only, and the invention is not limited to these values nor to any of them. No values are given for the diodes, which may be considered to have substantially no impedance in their forward direction and substantially infinite impedance in their reverse direction.

TABLE I

| | |
|---|---|
| Resistor **7** | 150 ohms. |
| Resistor **8** | 2.4K ohms. |
| Capacitor **9** | 10 mf. |
| Resistor **10** | 4.7K ohms. |
| Resistor **12** | 20K ohms. |
| Battery **14** | 45 volts. |
| Resistor **15** | 47K ohms. |
| Capacitor **18** | .02 mf. |
| Capacitor **21** | .02 mf. |
| Resistor **24** | 2.4K ohms. |
| Capacitor **25** | 10 mf. |
| Resistor **26** | 4.7K ohms. |
| Resistor **27** | 51K ohms. |
| Resistor **28** | 20K ohms. |
| Capacitor **30** | .02 mf. |
| Resistor **34** | 150K ohms. |
| Resistor **36** | 20K ohms. |
| Battery **37** | 45 volts. |
| Resistor **38** | 56K ohms. |
| Capacitor **39** | 560 mf. |
| Capacitor **41** | .1 mf. |
| Resistor **42** | 47K ohms. |
| Resistor **46** | 110K ohms. |
| Resistor **47** | 910K ohms. |
| Resistor **49** | 24K ohms. |
| Battery **50** | 8 volts. |
| Resistor **51** | 15K ohms. |
| Capacitor **53** | 680 mmf. |
| Resistor **54** | 11K ohms. |
| Resistor **55** | 47K ohms. |
| Resistor **56** | 50K ohms. |
| Resistor **58** | 22K ohms. |
| Capacitor **59** | 100 mmf. |

*Operation*

Signals are picked up by the coil 17 in the form of more or less sinusoidal potentials having amplitudes varying from 40 millivolts to 150 millivolts. These signals are transmitted through the coupling capacitor 18 to the base 6*b* of transistor 6. Stage 3 is provided with a resistor 7, in series with its emitter 6*e*, and not by-passed by a condenser. The presence of this resistance in the emitter circuit raises the input impedance of the stage 3 to a point where it provides critical damping for the coil 17. A typical coil 17 has an impedance of approximately 750 ohms at a reading frequency of 68 kilocycles. In the circuit whose impedance values are given in the table above, resistor 7 had a value of 150 ohms, and resistors 8 and 10 had resistances of 2.4K and 4.7K ohms, respectively. The impedance between base 6*b* and ground at the operating frequencies involved consists primarily of the impedance of the path through resistor 7 and of capacitor 9, the latter being very low. The resistors 8 and 10 are substantially shunted by this low resistance path. Consequently, the input impedance of stage 3 is substantially 150 ohms, being the impedance of resistor 7. While this is by no means an exact match for the 750 ohm impedance of coil 17, nevertheless the two impedances are of the same order of magnitude.

A wave impressed on input terminal 11 produces a potential drop across resistor 7. That potential drop is in effect a negative feedback, since its effect on the potential at output terminal 19 of stage 3 opposes the effect of the input signal applied at terminal 11. By way of a specific example, consider that a positive signal is impressed on base 6*b*. The effect of such a signal is to increase the current flow through collector 6*c*. However, that same positive signal produces an increased current flow through emitter 6*e* and an increased potential drop across resistor 7. That potential drop is in a sense to swing emitter 6*e* positive, which in turn tends to decrease the current flow through collector 6*c*. While this negative feedback lowers the amplification which may be obtained from stage 3, nevertheless it has many beneficial effects, including the elimination of oscillations from the stage. That is to say, an impedance of this magnitude as a load on the coil 17 effectively damps out oscillations in the circuit of the coil so that it recovers quickly after transmitting a signal and is ready to transmit the next signal without substantial distortion. Also, resistor 7 cancels out some of the inherent internal positive feedback in the transistor 6 and effectively extends the width of the operating frequency band to about 220 kilocycles for this stage.

Stage 4 reproduces the signal transmitted to it through coupling capacitor 21 with a high voltage gain. This is enhanced by providing the grounded collector stage 5 as the third stage, which has a high input impedance, thereby insuring a large load resistance for stage 4. Furthermore, the very low output impedance of the grounded collector stage 5 matches well with the low input impedance of the single shot trigger circuit 2.

A parallel feedback coupling from the output of stage 5 to the output of stage 3 is provided through capacitor 41 and resistor 42. This provides a much wider band of operating frequencies, and lowers the peak response at the resonant frequency of the circuit, so that a much flatter response over the whole range of operating frequencies is obtained.

The signal reaching input terminal 40 of the single shot trigger 2 is still a nominally sinusoidal signal. The function of the single shot trigger circuit is to convert it to a square wave signal. The output signal at terminal 40 has both positive and negative going portions, which may have a total time duration for a complete wave of 14.7 microseconds. The single shot trigger produces an output signal continuing, for example, for 10 microseconds.

The diode 45 connected in the input of the single shot trigger is provided to block out the negative going portions of the signal at terminal 40, to prevent them from cutting off the single shot trigger prematurely. The right hand terminal of diode 45 is connected through a resistor 47 to the negative terminal of battery 37. The resistors 49 and 46 provide a voltage divider between ground potential and −45 volts and establish the normal potential at the left hand terminal of diode 45 at a fixed negative value. In order for a signal to pass the diode 45 it must have a positive value greater than this fixed negative value. This arrangement effectively blocks out the negative going portions of the input signals.

Transistor 43 is normally "off," since its emitter **43*e* is at a potential of −8 volts, as determined by battery 50, and its base 43*b* is at a normal negative potential (in the example illustrated and described, −8.3 volts). This normal potential of base 43*b* is fixed by the voltage divider action of resistors 54, 58, and 47, connected between the +45 volt line 13 and the −45 volt line 48. The transistor 44 is normally conductive, its base being normally at a potential of −7.3 volts and its emitter at −8. The normal potential of base 44*b* is fixed by voltage divider action from +45 volt line 13 through resistors 56 and 55, and the base-to-emitter impedance of transistor 44 to the −8 volt terminal of battery 50**.

When a positive signal is received at the base **43*b*, transistor 43 is turned "on," and its output terminal 52 swings in a negative sense, transmitting a negative signal through coupling capacitor 53 to base 44*b* and turning transistor 44 "off." Output terminal 60 thereupon swings positive, the positive swing of this potential being limited by the clamping diode 57 to a value of 0 volts. This positive going potential is transmitted back through capacitor 59 and resistor 58 to the base 43*b* of transistor 43, where it is effective to hold that transistor "on." Transistor 43 remains "on" and transistor 44 remains "off" until the charge on capacitor 53 leaks off through resistors 55 and 56, whereupon base 44*b* resumes its normal potential and transistor 44 again becomes conductive. The resulting negative swing of output terminal 60 is transmitted back through capacitor 59 and resistor 58 to turn off the transistor 43. The swings of the transistor 44 from its "on" to its "off" status and back again take place suddenly, thereby insuring that the output terminal at 60 has a square wave output signal in response to an input pulse, the duration of the output signal being determined by the time constant of the circuit including capacitor 53 and resistors 55 and 56. The duration and hence the signal frequency of the output pulses may therefore be controlled by changing the setting of resistor 56**.

While we have shown and described a preferred embodiment of our invention, other modifications thereof will readily occur to those skilled in the art, and we therefore intend our invention to be limited only by the appended claims.

We claim:

1. An amplifier for a signal within a predetermined frequency range derived from a magnetic pickup coil, comprising an amplifier stage including a transistor having a collector electrode, a base electrode and an emitter electrode; an input circuit including said coil, coupling means connecting one terminal of said coil to said base electrode, means connecting the other terminal of said coil to said emitter electrode including a first resistor, a capacitor in parallel with said first resistor and having a low impedance at said frequency range, a second resistor connected in series with said emitter electrode and unbypassed, said second resistor having an impedance of the same order of magnitude as the impedance of said coil but somewhat smaller and effective to produce a negative feedback potential at said emitter electrode opposing the potential transmitted from the coil to the base electrode; and an output circuit connected between said collector and said other terminal of said coil and including an output terminal.

2. An amplifier as defined in claim 1, including a second amplifier stage, comprising a second transistor, input means and output means, means coupling the output terminal of said first-mentioned stage to the input means of said second stage; a third stage of the grounded collector type comprising a third transistor, input means and output means, means coupling the output means of the second stage to the input means of the third stage; and parallel feedback means including a resistor and a capacitor in series connected between said third stage output means and said first stage output means.

References Cited in the file of this patent

UNITED STATES PATENTS

| | | |
|---|---|---|
| 2,517,960 | Barney et al. | Aug. 8, 1950 |
| 2,585,077 | Barney, A. | Feb. 12, 1952 |
| 2,620,448 | Wallace | Dec. 2, 1952 |
| 2,622,213 | Harris | Dec. 16, 1952 |
| 2,633,564 | Fleming | Mar. 31, 1953 |
| 2,659,773 | Barney, B. | Nov. 17, 1953 |
| 2,723,080 | Curtis | Nov. 8, 1955 |
| 2,750,452 | Goodrich | June 12, 1956 |
| 2,760,007 | Lozier | Aug. 21, 1956 |
| 2,762,873 | Goodrich | Sept. 11, 1956 |
| 2,774,826 | Moulon | Dec. 18, 1956 |

FOREIGN PATENTS

| | | |
|---|---|---|
| 692,353 | Great Britain | June 3, 1953 |

OTHER REFERENCES

Shea text: "Principles of Transistor Circuits," pages 349–352, pub. 1953 by John Wiley & Sons, N. Y. C.